United States Patent
Meister

(10) Patent No.: US 6,200,514 B1
(45) Date of Patent: Mar. 13, 2001

(54) PROCESS OF MAKING A BIT BODY AND MOLD THEREFOR

(75) Inventor: Matthias Meister, Celle (DE)

(73) Assignee: Baker Hughes Incorporated, Houston, TX (US)

(*) Notice: Subject to any disclaimer, the term of this patent is extended or adjusted under 35 U.S.C. 154(b) by 0 days.

(21) Appl. No.: 09/247,105

(22) Filed: Feb. 9, 1999

(51) Int. Cl.⁷ .......................... B29C 33/38; B29C 35/08; B29C 41/02

(52) U.S. Cl. .......................... 264/401; 264/219; 264/221; 264/227; 264/308; 264/317; 264/338; 264/497

(58) Field of Search .................................. 264/219, 221, 264/227, 308, 317, 338, 401, 497

(56) References Cited

U.S. PATENT DOCUMENTS

| | | |
|---|---|---|
| 3,471,921 | 10/1969 | Feenstra et al. . |
| 3,757,878 | 9/1973 | Wilder et al. . |
| 3,757,879 | 9/1973 | Wilder et al. . |
| 3,986,546 | 10/1976 | Green et al. . |
| 4,064,926 | 12/1977 | Naegele . |
| 4,398,952 | 8/1983 | Drake . |
| 4,414,028 | 11/1983 | Inoue . |
| 4,423,646 | 1/1984 | Bernhardt . |
| 4,442,219 | 4/1984 | TenEyck . |
| 4,484,644 | 11/1984 | Cook et al. . |
| 4,536,535 | 8/1985 | Usala . |
| 4,613,648 | 9/1986 | Usala . |
| 4,702,304 | 10/1987 | Rice . |
| 4,735,974 | 4/1988 | Mandorf . |
| 4,863,538 | 9/1989 | Deckard . |
| 4,884,477 | 12/1989 | Smith et al. . |
| 4,919,013 | 4/1990 | Smith et al. . |
| 5,000,273 | 3/1991 | Horton et al. . |
| 5,001,091 | 3/1991 | Pujari et al. . |
| 5,017,753 | 5/1991 | Deckard . |
| 5,090,491 | 2/1992 | Tibbitts et al. . |
| 5,101,692 | 4/1992 | Simpson . |
| 5,132,143 | 7/1992 | Deckard . |
| 5,155,321 | 10/1992 | Grube et al. . |
| 5,155,324 | 10/1992 | Deckard et al. . |
| 5,156,697 | 10/1992 | Bourell et al. . |
| 5,182,170 | 1/1993 | Marcus et al. . |
| 5,252,264 | 10/1993 | Forderhase et al. . |
| 5,284,695 | 2/1994 | Barlow et al. . |
| 5,304,329 | 4/1994 | Dickens, Jr. et al. . |
| 5,316,580 | 5/1994 | Deckard . |
| 5,332,051 | 7/1994 | Knowlton . |
| 5,342,919 | 8/1994 | Dickens, Jr. et al. . |
| 5,352,405 | 10/1994 | Beaman et al. . |
| 5,373,907 | 12/1994 | Weaver . |
| 5,385,780 | 1/1995 | Lee . |
| 5,433,280 | 7/1995 | Smith . |
| 5,441,121 | 8/1995 | Tibbitts . |
| 5,453,241 | 9/1995 | Akerman et al. . |
| 5,511,603 | 4/1996 | Brown et al. . |
| 5,544,550 | 8/1996 | Smith . |
| 5,618,484 | 4/1997 | Mogensen et al. . |
| 5,632,326 | 5/1997 | Gough . |
| 5,638,724 | 6/1997 | Sanders . |
| 5,641,015 | 6/1997 | Challand . |
| 5,663,883 | 9/1997 | Thomas et al. . |
| 5,695,708 | 12/1997 | Karp et al. . |
| 5,817,206 | 10/1998 | McAlea et al. . |
| 5,846,370 | 12/1998 | O'Connor . |

FOREIGN PATENT DOCUMENTS

| | | |
|---|---|---|
| 33 47 501 A1 | 5/1985 | (DE) . |
| 0 096 591 | 12/1983 | (EP) . |
| 0 145 421 | 6/1985 | (EP) . |
| 1 572 543 | 7/1980 | (GB) . |
| 2 230 981 | 11/1990 | (GB) . |
| 2 287 959 | 10/1995 | (GB) . |
| 2 296 673 | 7/1996 | (GB) . |
| WO 90/03893 | 4/1990 | (WO) . |
| WO 92/08592 | 5/1992 | (WO) . |

OTHER PUBLICATIONS

Author unknown, "Models in Minutes—and At Your Desk", *Machine Design*, pp. 20 & 23, Oct. 22, 1993.

Author unknown, "Rapid Mold Maker Promise Faster Metal Prototypes", *Machine Design*, Nov. 26, 1992.

Author unknown, "Protech Engineer Applies Finishing Touch to Stereolithography", pp. 36 & 37, undated.

Dvorak, Paul, "Rapid Prototypes for Production Parts", *Machine Design*, pp. 48–54, Oct. 8, 1993.

Protech Services, Inc. company brochure, undated.

Tait, David, Autofact '93 Conference materials entitled "Cashing in on Rapid Prototyping", Nov. 10, 1993.

Wohlers, Terry, Autofact '93 Conference materials entitled Advancements in Rapid Prototyping, Nov. 10, 1993.

News Release—from Soligen, Inc., entitled Soligen Announces DSPC™ Machine Order by Ashland Chemical, Jul. 14, 1993.

News Release—from Soligen, Inc. entitled "Soligen Demonstrates Fast Production of Casting Molds is Feasible Multiple Jets Used to Greatly Increase Production Speed", Aug. 17, 1993.

News Release—from Soligen, Inc., entitled "Soligen Demonstrates Surface Finish Improvement for Casting Process", Nov. 8, 1993.

Soligen, Inc. brochure entitled "Technology Backgrounder", May 1993.

(List continued on next page.)

Primary Examiner—Leo B. Tentoni
(74) Attorney, Agent, or Firm—Trask Britt

(57) ABSTRACT

A method of fabricating a resilient model of an article of manufacture, such as an earth-boring drill bit body or component thereof, including fabricating the resilient model of the article of manufacture by layered manufacturing techniques. The resilient model may then be employed to cast one or more molds from refractory material. The molds may be used to fabricate the modeled article of manufacture. The invention also includes a resilient, layer-manufactured model of an article of manufacture, such as an earth-boring drill bit.

40 Claims, 10 Drawing Sheets

OTHER PUBLICATIONS

Soligen, Inc. brochure entitled "If all metal parts were this simple, there would be no need for Direct Shell Production Castings", undated.

Ashley, Steven, "CGI Casting: A New Iron in the Fire", *Mechanical Engineering*, vol. 114/No. 11, pp. 49–51, Nov. 1992.

Uziel, Yehoram, An Unconventional Approach to Producing Investment Casting, *Modern Casting*, Aug. 1993.

Prioleau, Frost, et al., "The Virtual Vision Story", *Pro E The Magazine*, vol. 1, No. 2, pp. 1–4, Fall 1993.

DTMonitor Newsletter, vol. 3, No. 2, Summer 1993.

Teague, Paul E., et al. Prototyping Expands Design's Portfolio, *Design News*, Jun. 21, 1993.

Lom–1015 brochure entitled "The Power of Lom is now within reach", undated.

Stratasys™, Inc. brochure for FDM 1000®, undated.

PROCESS OF MAKING A BIT BODY AND MOLD THEREFOR

BACKGROUND OF THE INVENTION

1. Field of the Invention

The present invention relates to layered manufacturing methods of fabricating earth-boring drill bits and other articles of manufacture. Particularly, the present invention relates to the use of deformable, resilient, layer-manufactured models in the production of molds for earth-boring drill bits and other articles of manufacture. More specifically, the present invention relates to deformable, layer-manufactured models that may be employed in the production of a plurality of molds.

2. Background of Related Art

Conventionally, the bit bodies of metal particulate-based earth-boring drill bits, such as tungsten carbide bits, have been fabricated in graphite molds. The cavities of graphite molds are typically machined with a five- or seven-axis machine tool. Fine features are then added to the cavity of a graphite mold by hand-held machine tools. Additional clay work may also be required to obtain the desired configuration of some features of the bit body. Thus, the fabrication of such graphite molds is typically very time consuming and expensive. Moreover, the use of graphite molds is somewhat undesirable from an environmental and health standpoint, as the machining of such molds typically generates large amounts of graphite or carbon dust.

In fabricating tungsten carbide-based or other metal particulate-based articles of manufacture, such as a bit body of an earth-boring drill bit, the cavity of the graphite mold is filled with a matrix material, such as tungsten carbide. Typically, the matrix material is then vibrated or otherwise packed to decrease the amount of space between adjacent particles of the matrix material. Next, the matrix material is infiltrated in a furnace with a molten binder material, such as a copper-nickel alloy. After the bit has cooled, the graphite mold is then typically destroyed to facilitate removal of the infiltrated bit body therefrom. Thus, the use of graphite molds may be further undesirable in that only a single bit body may be fabricated from each mold and, thus, a new graphite mold must be machined for each new earth-boring drill bit.

Direct layered manufacturing processes eliminate the need for graphite molds. Direct layered manufacturing processes have been employed to fabricate earth-boring drill bits, molds for earth-boring drill bits, and other articles of manufacture. U.S. Pat. No. 5,544,550, which issued to Redd H. Smith on Aug. 13, 1996, and U.S. Pat. No. 5,433,280, which issued to Redd H. Smith on Jul. 18, 1995, disclose the use of layered manufacturing methods to produce earth-boring drill bits and other articles of manufacture.

The direct layered manufacturing of earth-boring drill bits or other articles of manufacture includes generating a three-dimensional computer model of the drill bit or article of manufacture, creating "slices" of the computer model, and using the computer model in conjunction with layered manufacturing equipment to fabricate the article of manufacture In operation, the layered manufacturing equipment sinters or otherwise secures a first layer of particles of a matrix material together, disposes a second layer of particles over the first layer, sinters particles in selected regions of the second layer together and to the first layer, and repeats this process to fabricate subsequent layers until the desired part has been formed from the matrix material particles.

State of the art layered manufacturing equipment and techniques have good resolution and may, therefore, be employed to manufacture parts that represent their three-dimensional computer model. Thus, once a drill bit or other article of manufacture has been fabricated from the matrix material, the particulate-based part may be infiltrated with a binder material that binds adjacent particles of matrix material together, and forms a substantially integral part that represents the computer model.

This type of layered manufacturing process is, however, somewhat undesirable since it takes a substantial amount of time (i.e., at least the length of the layered manufacturing process) to produce each layer-manufactured particulate-based part. Moreover, layered manufacturing machines that are capable of directly producing a metal part are typically expensive. Thus, the number of parts that may be produced over a given amount of time is limited by the number of available layered manufacturing machines.

Prior to infiltration, the particles of the matrices of particulate-based articles of manufacture produced by such direct layered manufacturing processes may be held together with a binder material, such as a thermoplastic polymer (e.g., polystyrene), a resin, or a low melting point metal (e.g., Wood's metal or a lead-based alloy). In layered manufacturing, the particles of metal matrix material are not, however, typically compacted to full density. The presence of binder material between particles of metal matrix material, or as a coating thereon, also reduces the density of the matrix. Moreover, due to the coefficients of thermal expansion of binder materials, and because of the space that exists between metal matrix particles and particles of binder material prior to melting or softening of the binder material, the dimensions of each layer may change during and after the layered manufacturing process, and shrink as the binder material cools. Further, prior to or during the subsequent infiltration of the matrix, thermoplastic polymer and resin binder materials are "burned out" of the matrix, exposing voids therein. Thus, direct layer-manufactured articles are typically not fully dense, and may shrink or become somewhat dimensionally distorted relative to the computer model employed to generate such articles.

In an effort to employ layered manufacturing processes to produce fully dense parts, so-called investment casting or "lost wax" processes have been employed to create a model that is subsequently used to produce a cast mold. Known layered manufacturing processes include the fabrication of plastic, wax, or paper models. Once the model has been employed to produce a mold, the model is destroyed by known investment casting processes (e.g., melting the plastic or wax or burning the paper), thereby exposing the cavity of the mold. The mold may then be employed in known processes, such as casting or forming a particulate-based matrix and infiltrating same, to fabricate a fully dense article of manufacture. After some articles of manufacture, such as earth-boring drill bits, have been fabricated in such a mold, the mold must be destroyed to remove the part therefrom. One such technique of layered manufacturing investment casting models, which may be used to fabricate earth-boring drill bits, is disclosed in British patent application serial no. 2 296 673 of Camco Drilling Group Limited (hereinafter "the British '673 Application"), which was published Oct. 7, 1996. Such investment casting processes, which employ layer-manufactured models, are, however, somewhat undesirable since the model may be employed to fabricate only a single mold. Thus, it may take longer to fabricate an article of manufacture when layered manufacturing techniques are employed to fabricate an investment casting model than when direct layered manufacturing techniques are used to fabricate the same article of manufacture. Moreover, each layer-manufactured investment casting model may be used to fabricate only one mold and, therefore, only one drill bit or other article of manufacture.

The British '673 Application also discloses the use of a layer-manufactured model that includes several pieces that are assembled prior to casting a mold and individually removed from the mold after casting. The model must then be reassembled prior to the production of another mold. As the use of a model with several individual pieces may require as many separate fabrication steps, as well as the assembly and disassembly of the pieces each time a mold is produced, that process is also time-consuming and, therefore, somewhat undesirable.

The British '673 Application discloses another method of producing molds for earth-boring drill bits, which includes employing layered manufacturing processes to produce a first mold, using the first mold to cast a deformable model, and employing the model to cast manufacturing molds. Although the deformable model may be employed to cast more than one manufacturing mold, this process is somewhat undesirable in that it requires several steps, including a layered manufacturing step, a model casting step, and a manufacturing mold casting step, to produce a manufacturing mold.

Pliable, resilient male mold models have also been cast in the cavities of machined graphite molds, then employed to form the cavities of female ceramic molds by casting the ceramic molds around the male mold model. Since the male mold model is made of a pliable, resilient material, the model may be removed from the cavity of the ceramic mold and reused to cast another female mold. This process is, however, somewhat undesirable since it requires the machining of a graphite mold. Moreover, in order to change any of the features of the mold, as is typically required by customers ordering earth-boring drill bits, a new graphite mold would have to be machined and male mold models cast therein.

Thus, a process is needed that employs a single layer-manufactured model to efficiently produce a plurality of earth-boring drill bit molds.

SUMMARY OF THE INVENTION

The present invention addresses each of the foregoing needs.

The method of the present invention includes fabricating a resilient bit body model by layered manufacturing techniques. The resilient bit body model may be hollow. Alternatively, the resilient bit body model may comprise a substantially solid mass. The resilient bit body model may include internal features, such as the internal fluid courses of a drill bit.

Preferably, the resilient bit body model is fabricated by layered manufacturing techniques, such as selective laser sintering ("SLS"), stereolithography ("STL"), three-dimensional printing, laminated object manufacturing ("LOM"), and other layered manufacturing processes.

After the bit body model has been fabricated, a bit mold may be cast around the bit body model. An exemplary material from which a bit mold may be cast includes room-temperature hardenable ceramics.

Upon hardening of the bit mold, the bit body model may be removed therefrom to expose a cavity of the mold. One or more subsequent molds may then be cast with the bit body model. The molds may each then be employed to fabricate a bit body, as known in the art.

Other advantages of the present invention will become apparent through consideration of the ensuing description, the accompanying drawing figures, and the appended claims.

DETAILED DESCRIPTION OF THE PREFERRED EMBODIMENTS

Referring now to FIGS. 1 through 4 of the drawings, exemplary drill bit body models 12 and 112 are depicted as three-dimensionally modeled by a state of the art CAD system. Such systems are well-known and widely used, and a particularly suitable commercially available CAD system for implementation of the present invention is the Pro/ENGINEER, offered by Parametric Technology Corporation.

Figure 1:
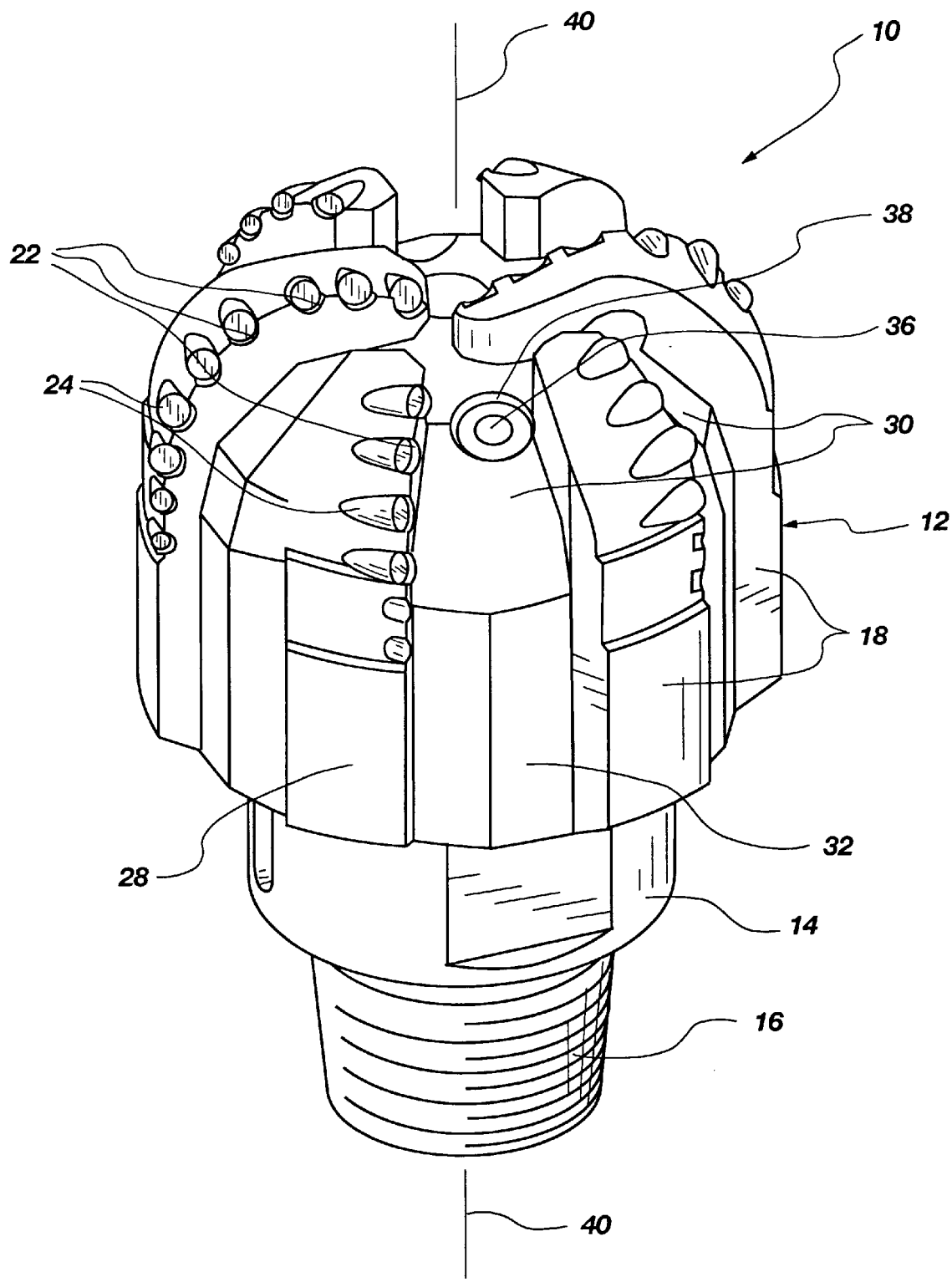
FIG. 1 is an inverted perspective view of a three-dimensional solid model of a rotary-type earth-boring drill bit, as might be designed by a computer-aided drafting ("CAD") system.
Figure 2:
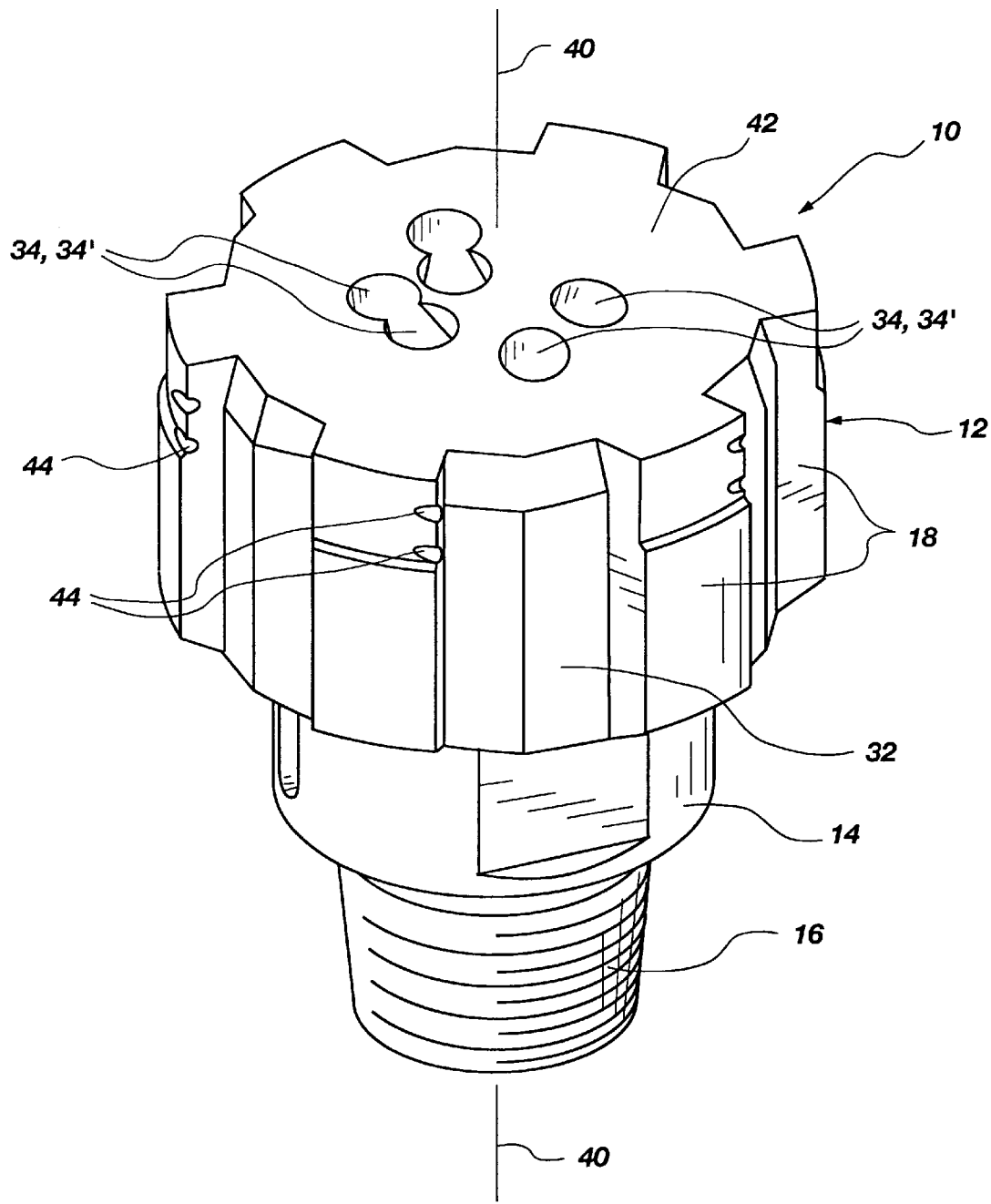
FIG. 2 is an enlarged perspective view of the drill bit of FIG. 1, sliced transversely to the longitudinal bit axis to expose an interior section thereof.
Figure 3:
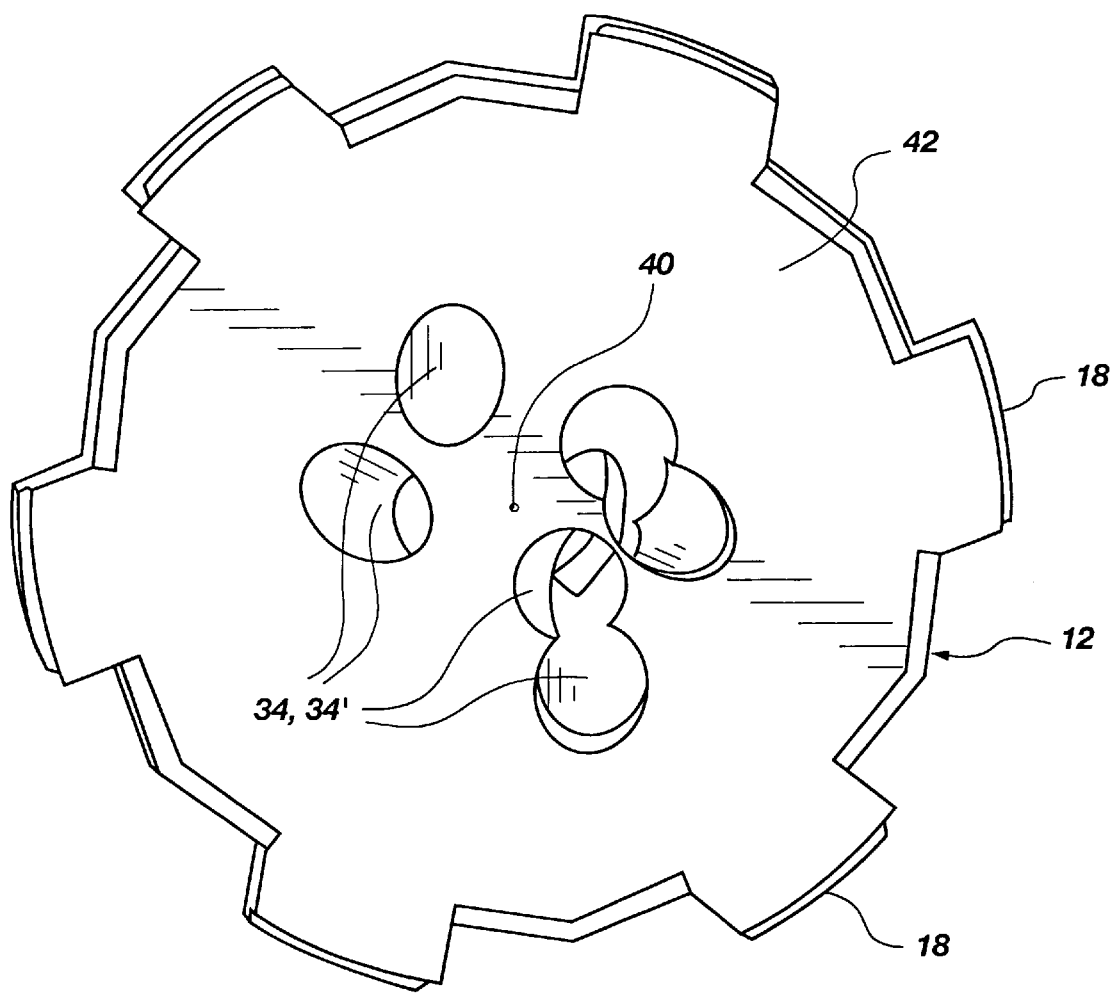
FIG. 3 is an enlarged top elevation of the exposed slice or layer of the drill bit segment depicted in FIG. 2.

With reference to FIGS. 1 through 3, a computer-generated model of a rotary-type earth-boring drill bit, including a first embodiment of a resilient bit body model 12 according to the present invention, is illustrated. Bit body model 12 may be fabricated by known layered manufacturing processes, including, without limitation, selective laser sintering ("SLS"), stereolithography ("STL"), three-dimensional printing, laminated object manufacturing ("LOM"), and other so-called rapid prototyping techniques. The bit body model 12 fabricated by these layered manufacturing techniques may include a variety of external and internal components.

Although FIGS. 1 through 4 illustrate bit body models 12 and 112 for fabricating drag-type drill bits, the methods of the present invention may also be employed to fabricate other types of earth-boring drill bits, such as roller cone bits, as well as other types of articles of manufacture.

Figure 1A:
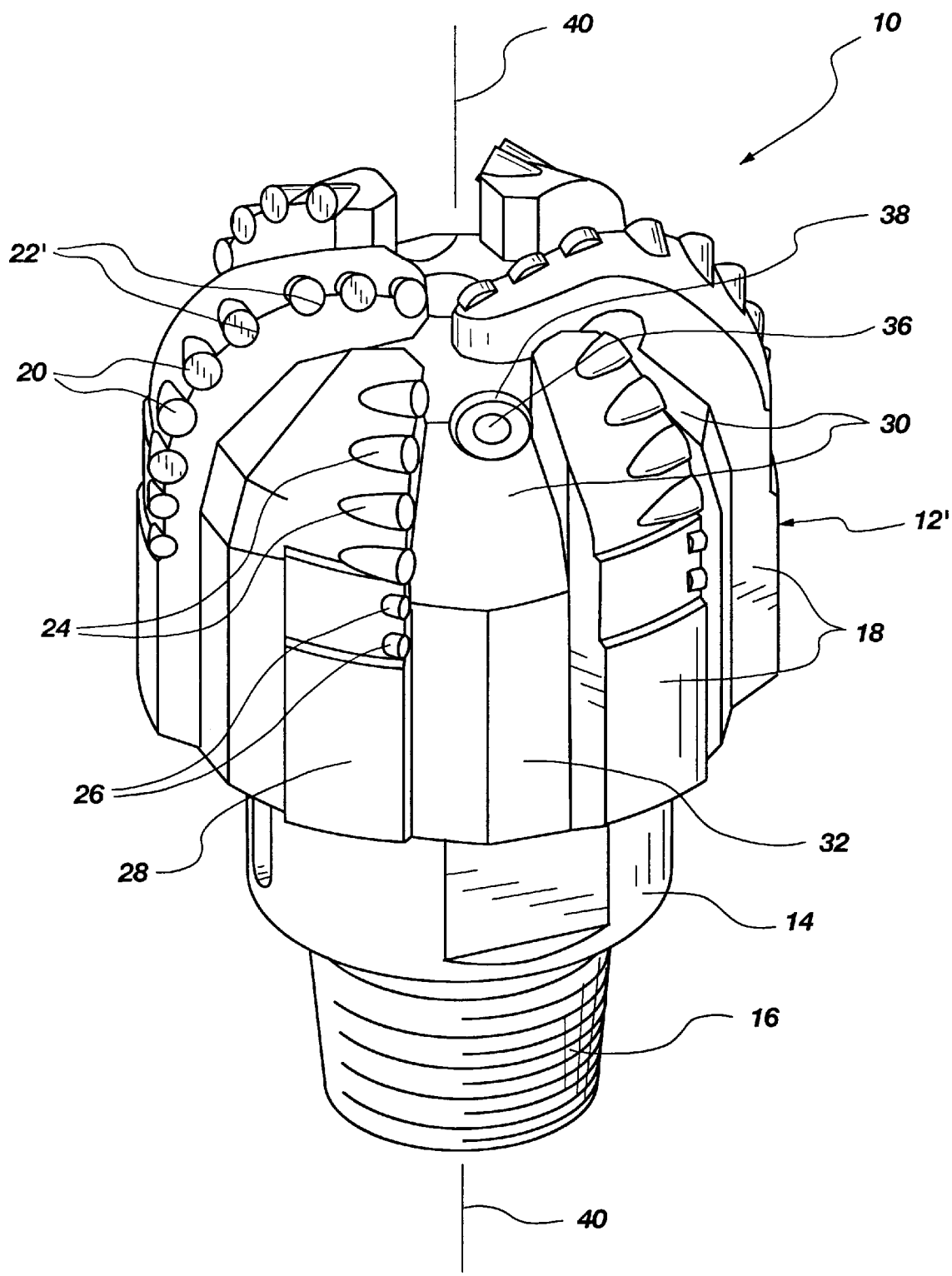
FIG. 1A is an inverted perspective view of a variation of the solid model shown in FIG. 1, including modeled cutters and inclined buttresses associated with some of the modeled cutters.

Bit body model 12 includes six blades or wings 18 including cutter pockets 22 that are capable of carrying cutting elements 20 (see FIG. 1A). Cutter pockets 22 may also include inclined buttresses 24 to support cutting elements 20 from the rear. Alternatively, with reference to FIG. 1A, a variation of the bit body model 12' may include cutting elements 20. Thus, a mold cast from bit body model 12' would include recesses in the cavity thereof to receive thermally stable cutters prior to fabricating a bit body therein. As a bit body is fabricated in a mold cavity having thermally stable cutters disposed therein, the cutters may be integrally secured to the bit body.

Blades 18 are separated by generally radially extending fluid courses 30 leading to junk slots 32, the fluid courses 30 and junk slots 32 of an operable drill bit being provided with drilling fluid, or "mud", from the drill string through a bit shank 14. In the operation of a drill bit, drilling fluid enters the drill bit through shank 14 and flows through internal fluid passages 34, which lead to nozzles 36 that are disposed in cavities 38. Cavities 38 open into fluid courses 30.

Alternatively, bit body model 12 may lack internal fluid passages 34, which may be incorporated into a bit body during fabrication thereof by means of mold inserts, as known in the art.

As illustrated, bit body model 12 includes a gage pad 28 longitudinally adjacent each blade 18. Modeled gage trimmers 26 may be positioned immediately adjacent and above (as depicted in the drawing figures) gage pads 28. Alternatively, bit body model 12 may include pockets (not shown), similar to cutter pockets 22, which are capable of carrying gage trimmers 26.

Blades 18, fluid courses 30 and the topographical details of bit body model 12 collectively define what may be termed the "bit face", being the surface of the bit that contacts the undrilled formation at the bottom of the borehole. The exterior shape of a diametrical cross-section of the bit body model 12 taken along the longitudinal bit axis 40 defines what may be termed the bit or "crown" profile.

FIG. 1 also illustrates, in phantom, other features of a drill bit 10 that may be assembled with bit body model 12 to fabricate a finished drill bit 10, including a tubular bit shank 14 that may be secured to or integral with a bit blank (not shown), and an American Petroleum Institute (API) threaded pin connection 16 secured to an external end of bit shank 14.

Figure 4:
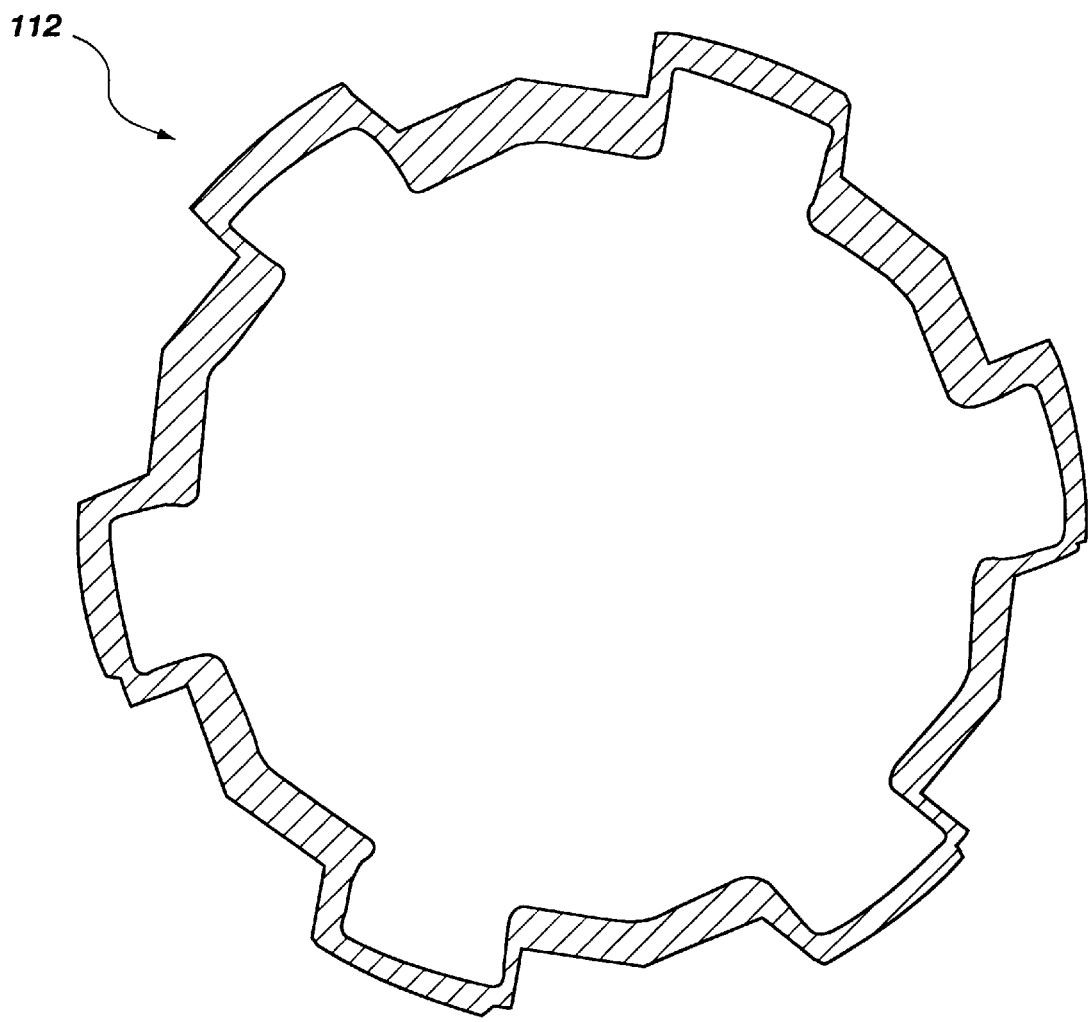
FIG. 4 is a cross section of a substantially hollow bit body model representative of the drill bit of FIGS. 1–3.

Turning now to FIG. 4, another embodiment of a resilient bit body model 112 may comprise a substantially hollow, resilient structure. Bit body model 112 may include each of the features described above in reference to FIGS. 1 through 3. Bit body model 112 may also include supports or seats to facilitate the correct positioning and orientation of fluid passages relative to the face of the model. Bit body model 112 may similarly include structures to facilitate the proper positioning and orientation of other elements.

Layered-Manufacture of the Resilient Bit Body Model

As shown in FIG. 2 of the drawings, a solid, three-dimensional model of bit body model 12 may be numerically "sliced" along any desired plane and, in this instance, along a plane perpendicular to the longitudinal bit axis 40 of bit body model 12. Looking at surface 42 in FIG. 2, it is readily apparent that the bit body model may be readily numerically characterized as a series of superimposed, substantially two-dimensional thin layers of gradually varying cross section, which substantially two-dimensional layers, when completely stacked, define the three-dimensional bit body model 12 depicted in FIG. 1.

As shown in FIGS. 2 and 3, surface 42 may include apertures or voids where segments 34' of internal fluid passages 34 exist, the contiguous segments 34' in superimposed layers or slices comprising complete internal fluid passages 34 in bit body model 12. FIG. 2 also shows voids 44 in the surface of the bit body where gage trimmers 26 have been deleted, the method of the present invention providing a bit body model 12 without modeled cutting elements, gage trimmers, or nozzles.

Figure 5:
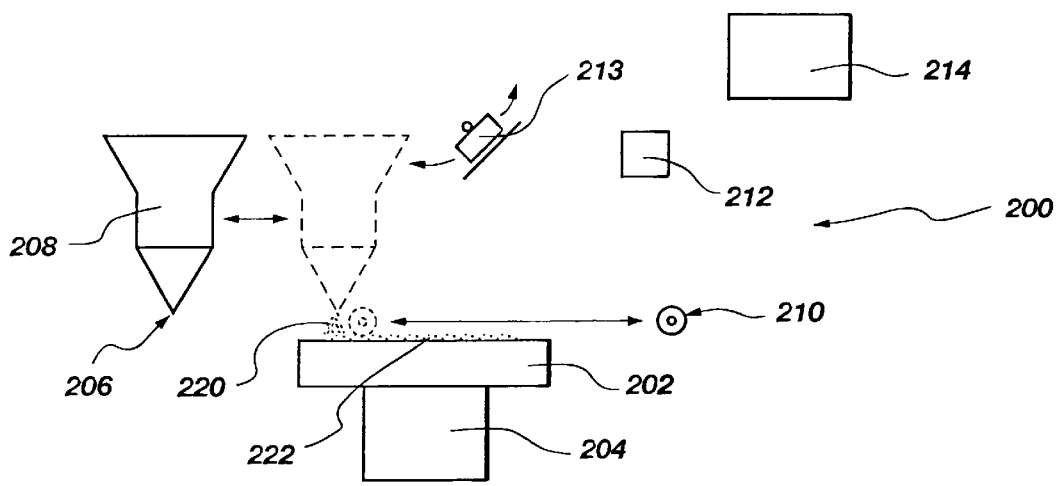
FIG. 5 is a schematic representation of a first preferred computer-controlled layering apparatus suitable for use in fabrication of a drill bit according to a preferred layered manufacturing process of the method of the present invention.
Figure 5A:
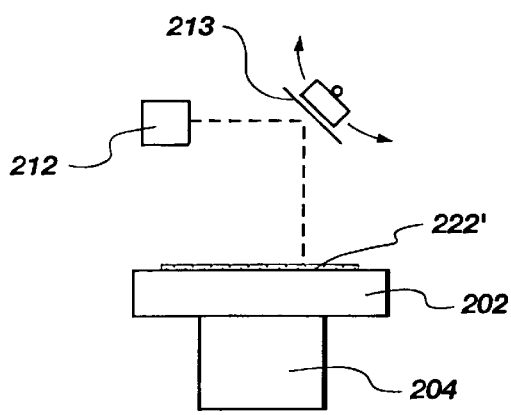
FIGS. 5A through 5D are schematic representations depicting use of the apparatus of FIG. 5 in the fabrication of a resilient bit body model.
Figure 5B:
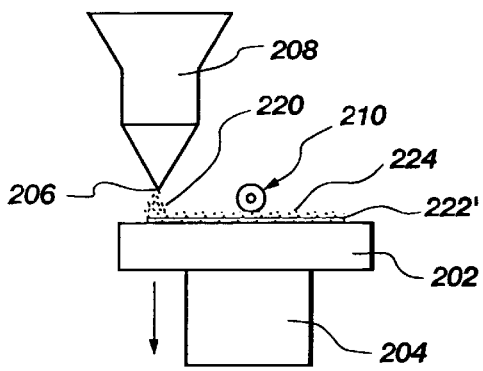
Figure 5C:
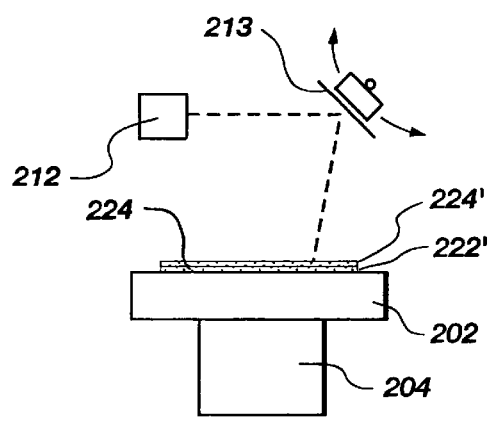
Figure 5D:
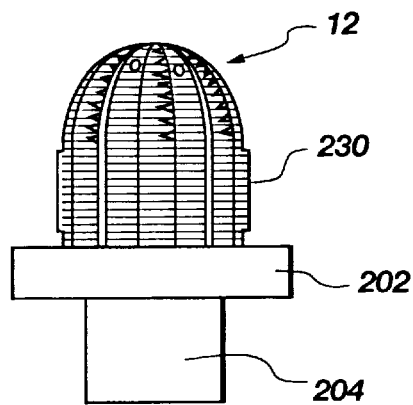

Referring now to FIGS. 5 through 5D, an exemplary apparatus 200 for the fabrication of a rotary drag bit in accordance with the present invention is schematically illustrated. Apparatus 200 includes a horizontal platen 202 on which a bit body model 12 (see FIGS. 1–3) is to be formed. Platen 202 is preferably vertically movable in precise increments, as by a stepper motor assembly or other means 204. A particulate spreader, comprising a linearly extending feed head 206 at the bottom of hopper 208, is horizontally movable across and above platen 202 to deposit a layer of particulate material 220, or particles, on platen 202. Hopper 208 may be vibrated to facilitate the flow of particulate material 220 and to render the flow more uniform, if desired. Vertically fixed, horizontally extending roller or scraper bar or blade 210 is also horizontally movable across platen 202 and may, if desired, be suspended from hopper 208. Fixative head 212 is suspended above platen 202. Fixative head 212 may comprise one of a variety of assemblies, depending upon the nature of the particulate material 220 employed to fabricate the bit body and the desired binder alternative employed to perform the method of the invention. Fixative head 212 may comprise, for example and not by way of limitation, a laser, an ink-jet nozzle or a metal spray gun. When fixative head 212 includes a laser, apparatus 200 may also include a galvanometer 213 with one or more pivotal mirrors. The sequence of operation and movements of platen 202, hopper 208, roller 210 and fixative head 212 are controlled by a computer 214 employing a suitable machine control program as is currently known in the art. Computer 214 may comprise a commercially available personal computer employing an Intel Pentium®-series or Pentium®II-series microprocessor. Vendors offering suitably programmed computers employing systems responsive to CAD.STL file formats and associated hardware adaptable to the method of the present invention include DTM Corporation, Austin, Tex.; Soligen, Inc., Northridge, Calif.; Stratasys, Inc., Eden Prairie, Minn.; Helisys, Inc., Torrance, Calif.; and 3D-Systems, Inc., Valencia, Calif.

Figure 5E:
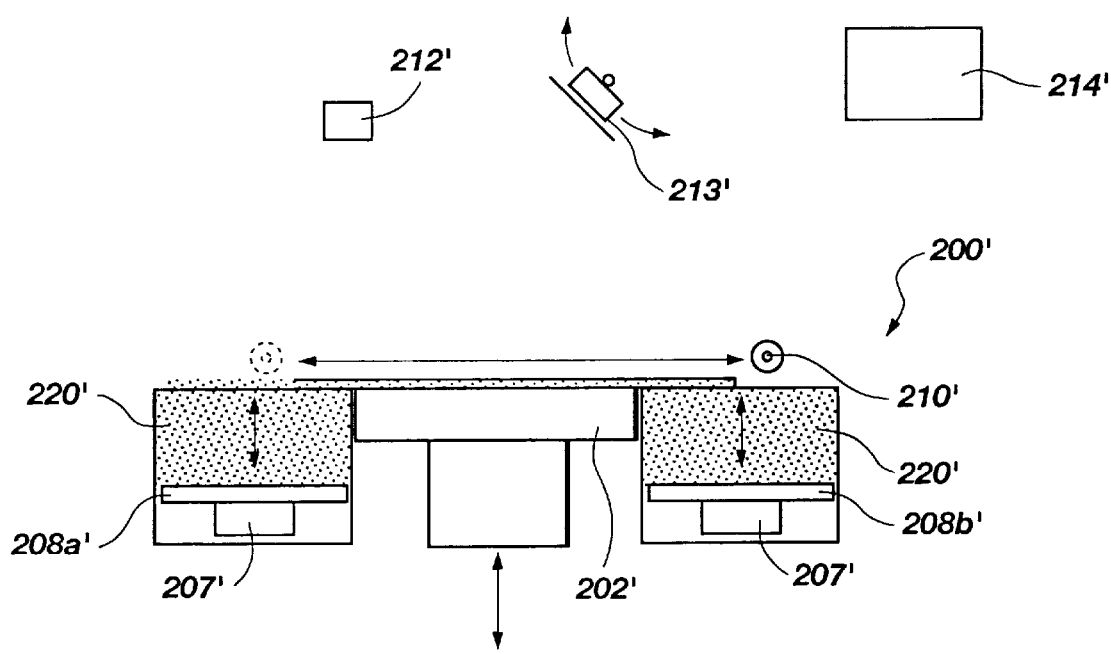
FIG. 5E is a schematic representation depicting another apparatus that may be used in the manufacture of a bit.

With reference to FIG. 5E, an alternative apparatus 200' for fabricating a rotary drag bit in accordance with the present invention is illustrated. Apparatus 200' includes a horizontal platen 202', similar to platen 202 of apparatus 200 illustrated in FIGS. 5 through 5D, on which a bit body model 12 (see FIG. 1) is to be formed. A particulate spreader, comprising cartridges 208a' and 208b' disposed beneath platen 202' and a roller or scraper bar or blade 210' horizontally movable across platen 202', deposits a layer of particulate material 220', or particles, over platen 202' in substantially uniform thickness. Cartridges 208a' and 208b' are preferably vertically movable in precise increments, as by a stepper motor assembly or other means 207' in order to move particulate material 220' upward for disposal on platen 202'. Apparatus 200' also includes a fixative head 212', a galvanometer 213' including at least one mirror, and a computer 214', similar to those of apparatus 200, described above in reference to FIGS. 5 through 5D Referring again to FIGS. 5 through 5D, in a selective laser sintering embodiment of the layered manufacturing process, the particulate material 220 preferably comprises a resilient elastomeric material, such as particles of the thermoplastic elastomer marketed under the trade name SOMOS® 201 by DTM Corporation. SOMOS® 201 has a hardness, as measured on the Shore A scale, of about 81 at 23° C., a melting point of about 159° C., and an average particle size of about 93 μm. Particles of other thermoplastic elastomers may also be employed in the selective laser sintering embodiment of the layered manufacturing process. Particles 220 of resilient model material are deposited by the horizontal movement of hopper 208 over platen 202 with the latter in its uppermost position. Roller or scraper 210 spreads and smooths particles 220 into a first thin layer 222, or particle layer, of substantially uniform thickness (for example, 0.003 to 0.020 inches). Thereafter, fixative head 212, which comprises a laser, directs a laser beam toward galvanometer-mounted mirrors 213, which reflect the laser beam toward selected regions of layer 222 in order to affix the particles 220 of the selected regions of layer 222 by melting or sintering. Particles 220 of these selected regions are preferably affixed in a regular horizontal pattern representative of a first or lowermost transverse layer or slice of bit body model 12 (see FIG. 2), as numerically defined and stored in computer 214. The laser beam is directed to impinge on particle layer 222 in those areas where bit body model 12 is comprised of solid material and avoids those areas wherein a segment 34' of an internal fluid passage 34 or other void (for example, a plenum) exists within bit body model 12.

As shown in FIG. 5A, the laser melts or sinters, and fuses particles 220 together, resulting in what may be termed a first particle layer 222', or first preform layer, having at least the peripheral outline of bit body model 12 at that vertical or longitudinal level, apertures or voids in that layer remaining as loose, unfused particles 220. The laser is then withdrawn and, as shown in FIG. 5B, platen 202 indexed downwardly a vertical distance which may or may not be equal to the thickness of particle layer 222 (i.e., a layer-manufactured structure may have layers of different thicknesses); a second layer 224 of particles 220 is deposited by feed head 206 of hopper 208, then spread and smoothed by roller or scraper 210 as previously described. As shown in FIG. 5C, the laser is again directed, this time at second layer 224, to follow a horizontal pattern representative of a second, higher layer or slice of bit body model 12, as numerically defined and stored in computer 214, fusing second layer 224 into second particle layer 224', or second preform layer. Preferably, second particle layer 224' is also simultaneously fused to first particle layer 222'. It will be appreciated that, in the drawing figures, the thicknesses of first and second particle layers 222' and 224', respectively, have been exaggerated to clearly illustrate the layered manufacturing process. Since the crown profile of bit body model 12 is not cylindrical, but somewhat tapered, and the internal fluid passages extend laterally, as well as longitudinally, within bit body model 12, the net result is that second particle layer 224', while contiguous with first particle layer 222', may not be identical thereto.

The particle deposition, smoothing and selective fusing of each successive preform layer is continued under computer control for hundreds or even thousands of layers until a recognizable three-dimensional structure, as depicted in FIG. 2, gradually emerges, and the layering process is further continued until a completed bit body model 12, as depicted in FIG. 1, is achieved, as shown in FIG. 5D. A variation of the layered manufacturing process employs a premix of particulate matrix material and powdered or particulate, elastomeric binder, which is deposited in layers on platen 202 as described above. When such a mixture of particulate matrix material and elastomeric binder is employed, the elastomeric binder is preferably softer and has greater elasticity (i.e., compressibility and elongation) than the particulate matrix material.

Referring again to FIG. 4, bit body model 112 may be fabricated by a process similar to the fabrication of bit body model 12, explained above in reference to FIGS. 5 through 5D. A layer of particulate, resilient elastomeric material is deposited over the entire cross section of a bit body layer and then selectively bonded in desired locations to define the periphery of the layer, such as by the use of a laser, as described above in reference to FIGS. 5 through 5D. A second layer of particulate, resilient, elastomeric material is then deposited over the entire cross section and selectively bonded together and, preferably, to the bonded regions of the previous layer or particulate, resilient elastomeric material. This process is repeated until the desired structure is completed. Particulate, resilient elastomeric material in the unbonded areas of the layer is then removed and may be recovered, thus providing a hollow bit body model 12 structure. The recovered material may be subsequently used to form another resilient bit body model.

Alternatively, with continued reference to FIGS. 5 through 5D, particles of a resilient elastomeric material may be deposited on the platen 202 in one or more rings or shells approximating the outer periphery and any internal features (e.g., internal fluid passages) of the exposed layer of bit body model 112 (see FIG. 4). The particles of resilient, elastomeric material may then be bonded together by a laser, and a subsequent controlled deposition of particles then effected to define the second layer, which is then formed and substantially simultaneously fused to the first layer.

Figure 6:
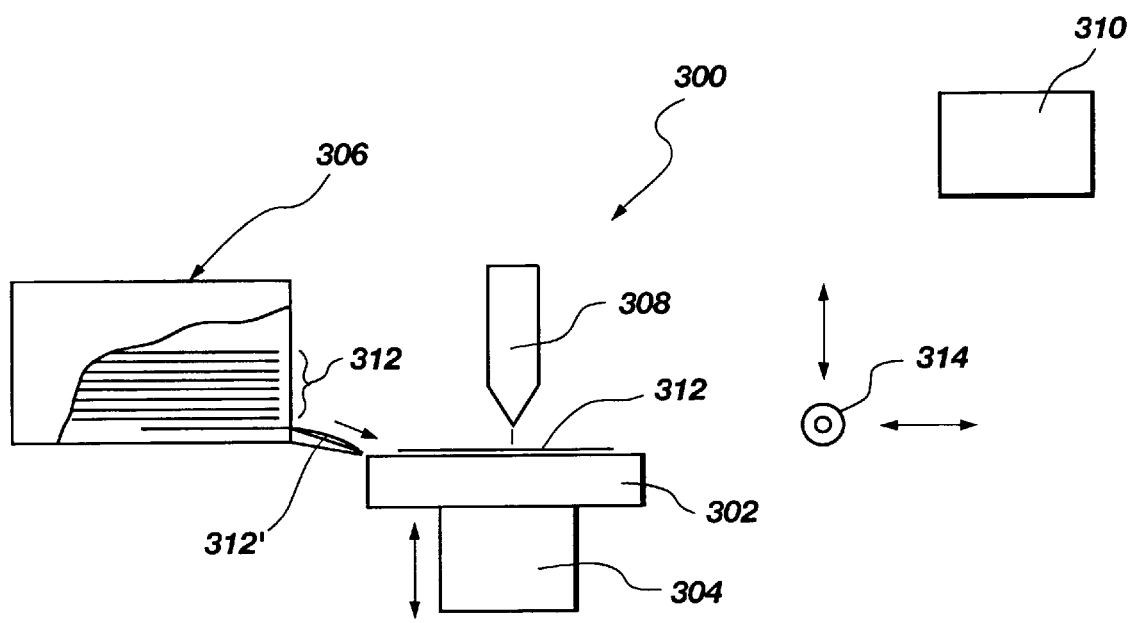
FIG. 6 is a schematic representation of a second preferred layering apparatus suitable for use in fabrication of a drill bit according to a variation of the layered manufacturing process of the method of the present invention.

Yet another variation of the layered manufacturing process that is useful in fabricating bit body models 12 (see FIGS. 1–3) and 112 (see FIG. 4), which is typically referred to as laminated object manufacturing, employs sheets of resilient, elastomeric material to form the bit body model. As depicted in FIG. 6 of the drawings, an apparatus 300 for effecting the method includes a platen 302, actuating means 304 for moving platen 302 in vertical increments, a sheet feeder 306, a laser head 308, and a control computer 310. Sheet feeder 306 may comprise a photocopier-type feeder and provide individual sheets, or may comprise a roll-type feeder with a feed roller and a take-up roller, as desired. In either case, a sheet 312 of suitable material, such as a resilient, thermoplastic elastomer, is placed on platen 302. Laser head 308, under control of computer 310, cuts an outline of the periphery of that layer of the bit body model 12 being formed. The surrounding sheet material may then be removed, if desired, and a second, uncut sheet 312' placed over sheet 312 is bonded to sheet 312 by suitable means, after which laser head 308 cuts the perimeter outline of the second layer of the bit body model 12. If desired, the laser may be used to rapidly heat the second sheet 312' and bond it to the first sheet 312 before sheet 312' is cut at its periphery. Alternatively, a heated roller 314 may be biased against and rolled over the uppermost sheet 312' to secure the uppermost sheet 312' and the immediately adjacent, underlying sheet 312 to each other before sheet 312' is cut to define the periphery of the corresponding layer of bit body model 12.

Such bonding can be effected by melting or sintering, or by an adhesive material disposed on the top, bottom, or both surfaces of each sheet. One or both surfaces of the sheets may be precoated with adhesive, or adhesive may be applied thereto, such as by rolling or spraying, during the layered manufacturing process.

Casting A Mold from the Resilient Bit Body Model

Referring now to FIGS. 7A through 7D, a method of casting a mold 410 with resilient bit body model 12 is schematically illustrated. Mold 410 is fabricated from a castable mold material 412, such as a castable ceramic (e.g., those marketed under the trade names COTRONICS 770, PYROMEDIA HS2, THERMOSIL 120, or THERMOSIL 220), or other castable, refractory mold material, such as those described in U.S. Pat. No. 5,632,326, which issued to Michael J. Gough on May 27, 1997, and U.S. Pat. No. 5,641,015, which issued to Nigel Challand on Jun. 24, 1997, the disclosures of both of which are hereby incorporated in their entireties by this reference. Preferably, mold material 412 does not substantially degrade the resilient material of bit body model 12. Mold material 412 should harden at a temperature lower than the melting temperature of the material from which bit body model 12 is fabricated (e.g., room temperature, 100° C., etc.), sufficiently to remove bit body model 12 therefrom without degradation of the mold 410 or of the bit body model 12. Mold material 412 should also withstand the melting temperature or glass transition temperature of the material to be cast by mold 410.

The exposed surfaces of bit body model 12 may be coated with a material that resists adherence to mold material 412, such as a known mold release material. Mold release materials that are useful for coating bit body model 12 include, without limitation, tetra-fluoroethylene (i.e., TEFLON), waxy materials, oils, and other materials that will facilitate the removal of bit body model 12 from a cast, hardened mold 410, and will not be substantially dissolved or degraded by mold material 412.

Figure 7A:
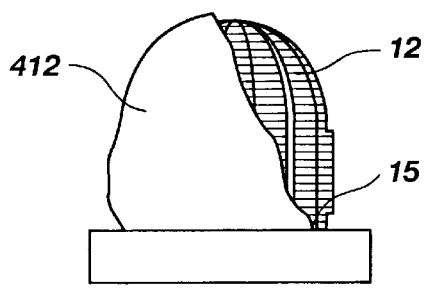
FIGS. 7A through 7D are schematic representations of a method of employing the resilient model to fabricate a mold.
Figure 7D:
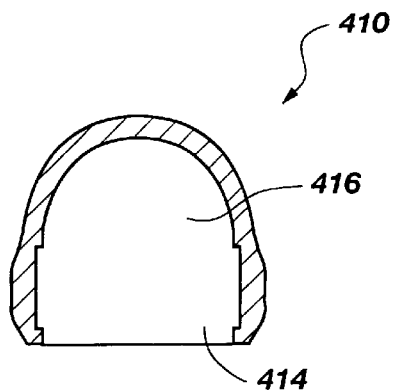
Figure 7B:
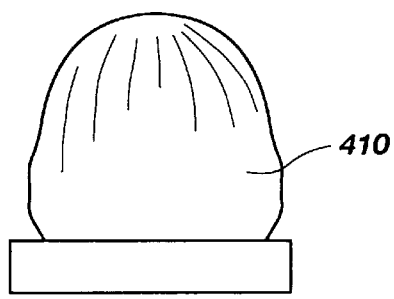
Figure 7E:
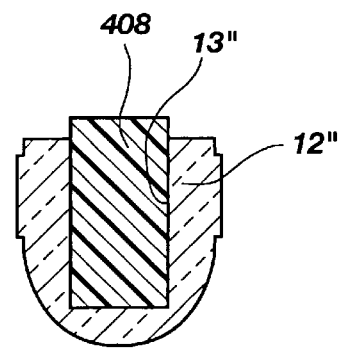
FIGS. 7E and 7F are schematic representations illustrating, in cross section, the use of a support material or rigid mandrel in combination with a substantially hollow bit body mold.
Figure 7C:
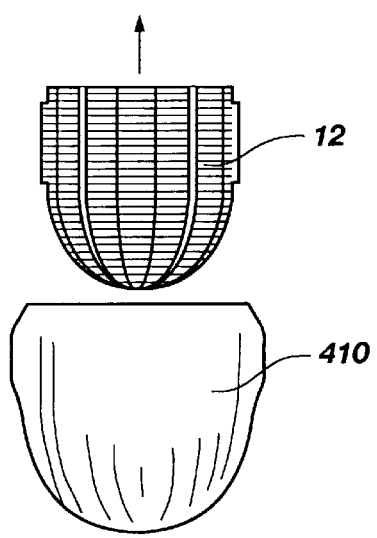
Figure 7F:
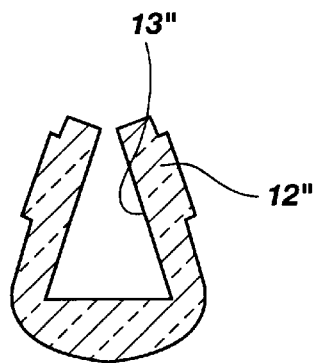

As shown in FIGS. 7E and 7F, if bit body model 12" is a substantially hollow structure, a support material, such as sand or another particulate material, or a rigid mandrel 408, which are collectively referred to herein as support structures, may be disposed within an internal cavity 13" of bit body model 12" to provide support to bit body model 12" and to thereby prevent the collapsing or distortion of bit body model 12" during the subsequent casting of a mold thereabout. The use of a support material or rigid mandrel 408 may also cause the exterior features of a substantially hollow bit body model 12" to protrude, thereby increasing the accuracy with which the mold cavity represents these exterior features. After a mold has been cast around bit body model 12" (see, e.g., FIGS. 7A–7D), the support material or rigid mandrel 408 may be removed from the substantially hollow bit body model 12", and the bit body model 12 may be collapsed and easily removed from the mold.

As shown in FIG. 7A, a quantity of mold material 412 is applied to the exposed surfaces of bit body model 12. Mold material 412 may be applied to bit body model 12 by dipping the bit body model in a slurry of mold material 412, by spraying a quantity of mold material 412 onto bit body model 12, by placing bit body model 12 into a container and pouring a quantity of mold material 412 around the bit body model, by applying a quantity of mold material 412 in paste form to the exposed surfaces of bit body model 12, by blowing a quantity of mold material 412 in paste form onto bit body model 12, or otherwise, as known in the art.

Mold material 412 may be applied to bit body model 12 in a plurality of thin layers, especially when a wet or liquid mold material 412 is used to produce mold 410. Prior to the application of a subsequent layer, each layer may be permitted to substantially harden.

Preferably, a base 15 of bit body model 12 remains exposed through mold material 412 and, therefore, through an opening 414 of mold 410 during the application of mold material 412 to bit body model 12. Alternatively, after mold 410 has cured or hardened sufficiently, a base 15 or another portion of bit body model 12 may be exposed through mold 410 by removing a portion of mold 410, thereby defining an opening 414 therethrough.

With reference to FIG. 7B, mold material 412 is then permitted to harden. Mold material 412 may harden at ambient temperature, or may be heated to an increased temperature, depending upon the type of material employed and the thickness thereof If mold material 412 is subjected to an increased temperature to harden same, the increased hardening temperature will preferably not melt or otherwise substantially degrade the resilient material of bit body model 12.

Referring now to FIG. 7C, once mold material 412 has hardened sufficiently, resilient bit body model 12 may be removed therefrom through opening 414. FIG. 7D shows a cavity 416 of mold 410, which is exposed through opening 414 as bit body model 12 is removed from mold 410. Bit body model 12 may then be used to produce another mold. If the bit body model is substantially hollow, as illustrated in FIG. 7F, bit body model 12" may be collapsed in order to facilitate its removal from cavity 416 of mold 410.

Mold 410 may be further hardened or cured, as needed, by known processes, such as furnacing or otherwise heating mold 410, which depend upon the type of mold material 412 employed, the thickness of the walls of mold 410, and the process employed to produce mold 410. Mold 410 may be disposed in a support structure, such as a mold casing with sand or another pliable mold material therein, to protect and support mold 410 as it is hardened or cured.

Fabricating A Bit with the Mold

Referring now to FIGS. 8A through 8E, an article of manufacture that resembles the resilient model employed to cast mold 410, such as a bit body of a rotary-type earth-boring drill bit that precisely resembles bit body model 12, may be fabricated in mold 410.

Figure 8A:
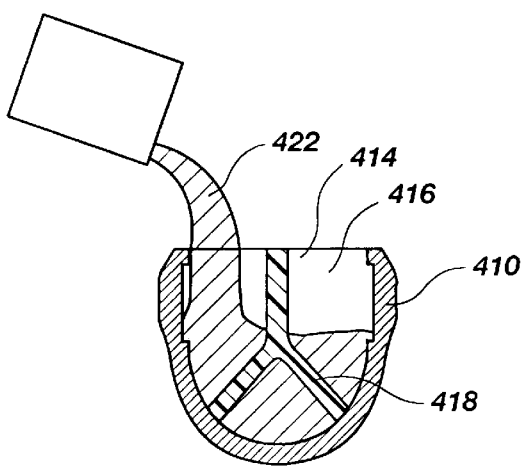
FIGS. 8A and 8B are schematic representations of a first method of fabricating an article of manufacture with the mold of FIGS. 7A through 7D.
Figure 8C:
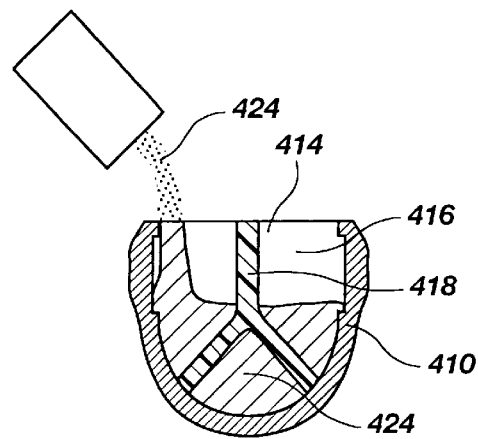
FIGS. 8C through 8E are schematic representations of another method of fabricating an article of manufacture with the mold of FIGS. 7A through 7D.
Figure 8B:
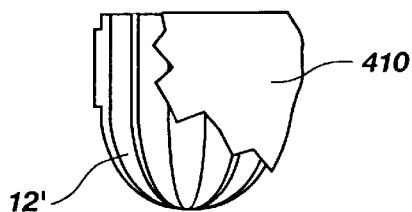

FIGS. 8A and 8B schematically illustrate the use of mold 410 to fabricate an article of manufacture by casting a molten material. As an example of casting an article of manufacture, a steel bit body 12' may be cast, as known in the art.

Mold 410 may be disposed in a support structure, such as a mold casing or other vessel having a quantity of pliable support material, such as sand, therein to provide support to mold 410 and prevent damage to same as one or more materials are disposed within cavity 416 to fabricate an article of manufacture.

Referring to FIG. 8A, mold inserts 418, such as inserts that will define the internal fluid courses of bit body 12' or other internal features of bit body 12', may be inserted into cavity 416 through opening 414 and positioned within cavity 416. A molten material 422, such as molten steel, from which the article of manufacture is to be fabricated, is then poured through opening 414 into cavity 416 of mold 410 and permitted to harden.

Referring to FIG. 8B, once the molten material 422 hardens, mold 410 may be removed from steel bit body 12'. Any cutting elements, blank, shank, nozzles, or other components may then be appropriately assembled with bit body 12' to provide a finished drill bit.

Figure 8D:
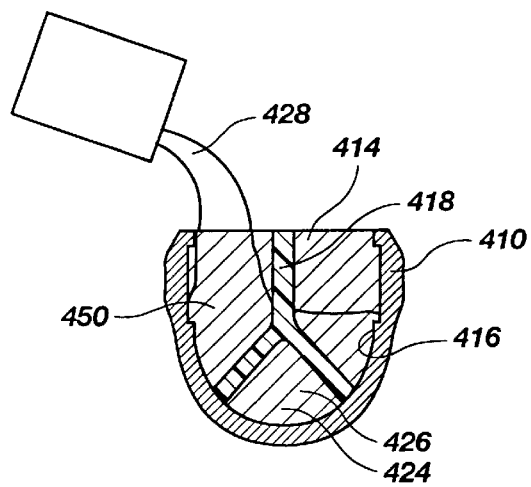
Figure 8E:
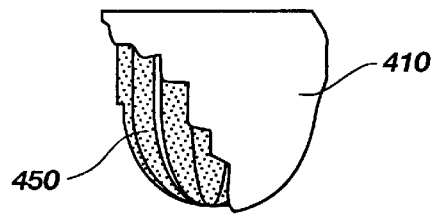

Turning now to FIGS. 8C through 8E, a method of fabricating an article of manufacture including a particulate-based matrix is illustrated. Specifically, FIGS. 8C through 8E depict the fabrication of a particulate-based bit body 12" of a rotary-type earth-boring drill bit.

With reference to FIG. 8C, mold inserts 418, such as inserts that will define the internal fluid courses of bit body 12" or other internal features of bit body 12", may be inserted into cavity 416 through opening 414 and positioned within cavity 416. If the bit body model 12 (see FIG. 1) that was employed to cast mold 410 included modeled cutting elements 20 or modeled gage trimmers 26, thermally stable cutting elements and gage trimmers may be appropriately positioned within cavity 416.

A particulate matrix material 424, such as tungsten carbide, iron, steel, Invar, ceramics, other suitable materials, or mixtures of any of the foregoing, is disposed in cavity 416 through opening 414 to define matrix 426. Preferably, matrix material 424 is densely compacted within cavity 416, as known in the art, such as by vibrating mold 410. A bit blank may also be disposed within cavity 416.

Referring now to FIG. 8D, matrix 426 is infiltrated with a molten infiltrant material 428, such as a copper-nickel alloy or other known infiltrant, as known in the art, such as by disposing infiltrant material 428 within a funnel 430 (not shown) continuous with opening 414 and heating funnel 430, infiltrant material 428, mold 410, and matrix 426 until infiltrant material 428 has substantially infiltrated the voids of matrix 426. Any cutting elements, gage trimmers, or bit blank disposed in cavity 416 are preferably integrally secured to bit body 450 by the infiltration process. Infiltrant material 428 is then permitted to cool and harden.

Referring to FIG. 8E, once infiltrant material 428 hardens, mold 410 may be removed from bit body 450. Any cutting elements, shank, nozzles, or other components may then be appropriately assembled with bit body 12" to provide a finished drill bit.

Although the foregoing description contains many specifics, these should not be construed as limiting the scope of the present invention, but merely as providing illustrations of some of the presently preferred embodiments. Similarly, other embodiments of the invention may be devised which do not depart from the spirit or scope of the present invention. Features from different embodiments may be employed in combination. The scope of the invention is, therefore, indicated and limited only by the appended claims and their legal equivalents, rather than by the foregoing description. All additions, deletions and modifications to the invention as disclosed herein which fall within the meaning and scope of the claims are to be embraced thereby.

What is claimed is:

1. A method of fabricating a mold for a bit body of an earth-boring drill bit, comprising:

fabricating a substantially hollow, resilient model of the bit body as a plurality of mutually contiguous at least partially superimposed layers using a layered manufacturing process said resilient model substantially representing a periphery of the bit body;

applying a refractory mold material to at least some external surfaces of said resilient model; and hardening said refractory mold material to form the mold.

2. The method of claim 1, wherein said layered manufacturing process comprises selective laser sintering, stereolithography, three-dimensional printing, or laminated object manufacturing.

3. The method of claim 1, wherein said layered manufacturing process comprises:

depositing a first layer of resilient material;

defining a periphery in said first layer at a first level corresponding to a periphery of a three-dimensional model of the bit body at said first level;

depositing a second layer of resilient material on said first layer; and securing said second layer to said first layer and defining a periphery in said second layer at a second level corresponding to a periphery of said three-dimensional model at said second level.

4. The method of claim 3, wherein at least some of said layers of resilient material comprise substantially unconsolidated particles when deposited, and said defining a periphery in said at least some of said layers comprises consolidating said particles in selected regions of said at least some of said layers.

5. The method of claim 1, further comprising applying a mold release material to a periphery of said resilient model prior to said applying said refractory mold material.

6. The method of claim 1, wherein said applying comprises dipping said resilient model into a quantity of said refractory mold material, spraying a quantity of said refractory mold material onto said resilient model, pouring a quantity of refractory mold material around said resilient model, blowing a quantity of said refractory mold material onto said resilient model, or packing a quantity of said refractory mold material about said resilient model.

7. The method of claim 1, wherein said applying comprises leaving a portion of said resilient model exposed through said refractory mold material.

8. The method of claim 1, wherein said hardening comprises exposing said refractory mold material to an increased temperature.

9. The method of claim 1, further comprising exposing said resilient model through said refractory mold material.

10. The method of claim 1, further comprising curing said refractory mold material.

11. The method of claim 1, further comprising removing said resilient model from the mold.

12. The method of claim 1, further comprising disposing a support structure within a hollow portion of said resilient model.

13. The method of claim 12, further comprising removing said support structure from said hollow portion following said hardening.

14. The method of claim 12, further comprising at least partially collapsing said resilient model and removing said resilient model from the mold.

15. A method of fabricating a mold for an article of manufacture, comprising:

fabricating a substantially hollow, resilient model of the article of manufacture as a plurality of mutually contiguous, at least partially superimposed layers using a layered manufacturing process, said resilient model substantially conforming in configuration and size to a periphery of the article of manufacture;

applying a refractory mold material to external surfaces of said resilient model; and hardening said refractory mold material to form the mold.

16. The method of claim 15, wherein said layered manufacturing process comprises:

depositing a first layer of resilient material;

defining a periphery in said first layer at a first level corresponding to a periphery of a three-dimensional model of the article of manufacture at said first level;

depositing a second layer of resilient material on said first layer; and securing said second layer to said first layer and defining a periphery in said second layer at a second level corresponding to a periphery of said three-dimensional model at said second level.

17. The method of claim 16, wherein at least some of said layers of resilient material comprise substantially unconsolidated particles when deposited, and said defining a periphery in said at least some of said layers comprises consolidating said unconsolidated particles in selected regions of said at least some of said layers.

18. The method of claim 15, wherein said fabricating comprises fabricating a substantially hollow resilient model substantially corresponding in configuration and size to a periphery of the article.

19. The method of claim 15, further comprising applying a mold release material to a periphery of said resilient model.

20. The method of claim 15, further comprising curing said refractory mold material.

21. The method of claim 15, further comprising exposing a portion of said resilient model through said refractory mold material.

22. A method of fabricating an earth-boring drill bit, comprising:

fabricating a substantially hollow, resilient model of a bit body of the earth-boring drill bit as a plurality of mutually contiguous, at least partially superimposed layers using a layered manufacturing process, said resilient model substantially representing a periphery of the bit body;

forming a mold with said resilient model by applying a refractory mold material to external surfaces of said resilient model and hardening said refractory mold material;

removing said resilient model from said mold; and disposing at least one material into at least one cavity of said mold to form a bit body substantially corresponding in configuration and size to said resilient model.

23. The method of claim 22, wherein said layered manufacturing process comprises:

depositing a first layer of resilient material;

defining a periphery in said first layer at a first level corresponding to a periphery of a three-dimensional model of the earth-boring drill bit at said first level;

depositing a second layer of resilient material on said first layer; and securing said second layer to said first layer and defining a periphery in said second layer at a second level corresponding to a periphery of said three-dimensional model at said second level.

24. The method of claim 23, wherein at least some of said layers of resilient material comprise substantially unconsolidated particles when deposited, and said defining a periphery in said at least some of said layers comprises consolidating said particles in selected regions of said at least some of said layers.

25. The method of claim 22, further comprising applying a mold release material to a periphery of said resilient model.

26. The method of claim 22, further comprising exposing at least a portion of said resilient model through said refractory mold material.

27. The method of claim 22, further comprising removing said mold from said bit body.

28. The method of claim 22, further comprising assembling another drill bit component with said bit body.

29. The method of claim 22, further comprising curing said refractory mold material.

30. The method of claim 22, wherein said disposing at least one material comprises disposing a metal material in a molten state.

31. The method of claim 30, wherein said disposing said molten metal material comprises disposing molten steel.

32. The method of claim 30, further comprising hardening said molten metal material.

33. The method of claim 30, wherein said disposing said at least one material comprises disposing a particulate matrix material.

34. The method of claim 33, wherein said disposing said particulate matrix material comprises disposing particulate tungsten carbide.

35. The method of claim 33, further comprising introducing an infiltrant material into said at least one cavity of said mold.

36. The method of claim 33, further comprising infiltrating said particulate matrix material with a molten infiltrant material.

37. The method of claim 36, further comprising hardening said molten infiltrant material.

38. A method of fabricating an article of manufacture, comprising:

fabricating a substantially hollow, resilient model of at least one component of the article of manufacture as a plurality of mutually contiguous, at least partially superimposed layers using a layered manufacturing process, said resilient model substantially conforming in configuration and size to a periphery of the at least one component of the article of manufacture;

forming a mold with said resilient model by applying a refractory mold material to external surfaces of said resilient model and hardening said refractory mold material;

removing said resilient model from said mold; and disposing at least one material into a cavity of said mold to form a bit body substantially corresponding in configuration and size to said resilient model.

39. The method of claim 38, wherein said layered manufacturing process comprises:

depositing a first layer of resilient material;

defining a periphery in said first layer at a first level corresponding to a periphery of a three-dimensional model of said at least one component at said first level;

depositing a second layer of resilient material on said first layer; and securing said second layer to said first layer and defining a periphery in said second layer at a second level corresponding to a periphery of said three-dimensional model at said second level.

40. The method of claim 39, wherein at least some of said layers of resilient material comprise substantially unconsolidated particles when deposited, and said defining a periphery in said at least some layers comprises consolidating said particles in selected regions of said at least some of said layers.

\* \* \* \* \*

UNITED STATES PATENT AND TRADEMARK OFFICE
CERTIFICATE OF CORRECTION

PATENT NO.      : 6,200,514 B1
DATED           : March 13, 2001
INVENTOR(S)     : Matthias Meister It is certified that error appears in the above-identified patent and that said Letters Patent is hereby corrected as shown below:

Column 1,
Lines 60-61, insert a period after "manufacture"

Column 12,
Line 4, insert a comma after "process"

Column 13,
Lines 26-29, delete in its entirety claim 18 and insert therefor the language of allowed claim 49 -- 18' The method of claim 15, further comprising removing said resilient model from the mold. --

Signed and Sealed this

Fifth Day of August, 2003

JAMES E. ROGAN
*Director of the United States Patent and Trademark Office*